United States Patent [19]

Welch et al.

[11] Patent Number: 5,016,948

[45] Date of Patent: May 21, 1991

[54] MODULAR UTILITY CART

[75] Inventors: Robert J. Welch, Dallas; Robert H. Nattress, Shavertown; Robert E. Nitkowski, Mountaintop; Westcoat Beakley, Wyoming, all of Pa.

[73] Assignee: InterMetro Industries Corporation, Wilkes-Barre, Pa.

[21] Appl. No.: 305,274

[22] Filed: Feb. 2, 1989

[51] Int. Cl.$^5$ .............................................. A47B 91/00
[52] U.S. Cl. .............................. 312/250; 312/341.1; 312/257.1; 211/126
[58] Field of Search ................ 312/250, 265.5, 257.1, 312/341.1, 343, 344, 346, 347, 350, 213; 211/126; 280/79.3, 47.35

[56] References Cited

U.S. PATENT DOCUMENTS

| | | | |
|---|---|---|---|
| 2,258,489 | 10/1941 | Grindle | 312/257.1 X |
| 2,574,692 | 11/1951 | Davidson et al. | 312/350 X |
| 2,589,441 | 3/1952 | Siegel | 312/250 X |
| 3,063,766 | 11/1962 | Goettl | 312/213 X |
| 3,688,707 | 9/1972 | White | 108/159 |
| 3,782,746 | 1/1974 | Isaacs | 280/79 X |
| 3,851,943 | 12/1974 | Afful | 312/347 |
| 4,138,175 | 2/1979 | Tattershall | 312/341.1 |
| 4,433,884 | 2/1984 | Edwards et al. | 312/250 |
| 4,549,774 | 10/1985 | Bessinger | 312/347 X |
| 4,666,221 | 5/1987 | Ernst | 312/341.1 |

FOREIGN PATENT DOCUMENTS 1010015 11/1965 United Kingdom ................ 312/250

Primary Examiner—Joseph Falk
Attorney, Agent, or Firm—Fitzpatrick, Cella, Harper & Scinto

[57] ABSTRACT

A light-weight modular utility cart has first and second identical side members which are preferably one-piece, molded plastic structures. Each side member may include a plurality of bottom projections which interlace with complementary bottom projections from another side member to form the cart bottom. The side members include structure for mounting thereto top members having different configurations. Alternatively, a single top configuration can be mounted on assembled different side member configuration having different heights. Each side member includes a plurality of upwardly-angled drawer rails on an inside surface thereof. The drawers may include identical first and second rollers each having a circumferential groove in the center thereof adapted to ride on an uppermost edge of the upwardly-angle drawer rail. Accessories may be attached to the cart through a tubular support structure, U-shaped channels, and a two-piece coupler having different size holes therein. The result is a modular utility cart that may be adapted to a wide variety of uses, yet is easy to manufacture and assemble.

12 Claims, 7 Drawing Sheets

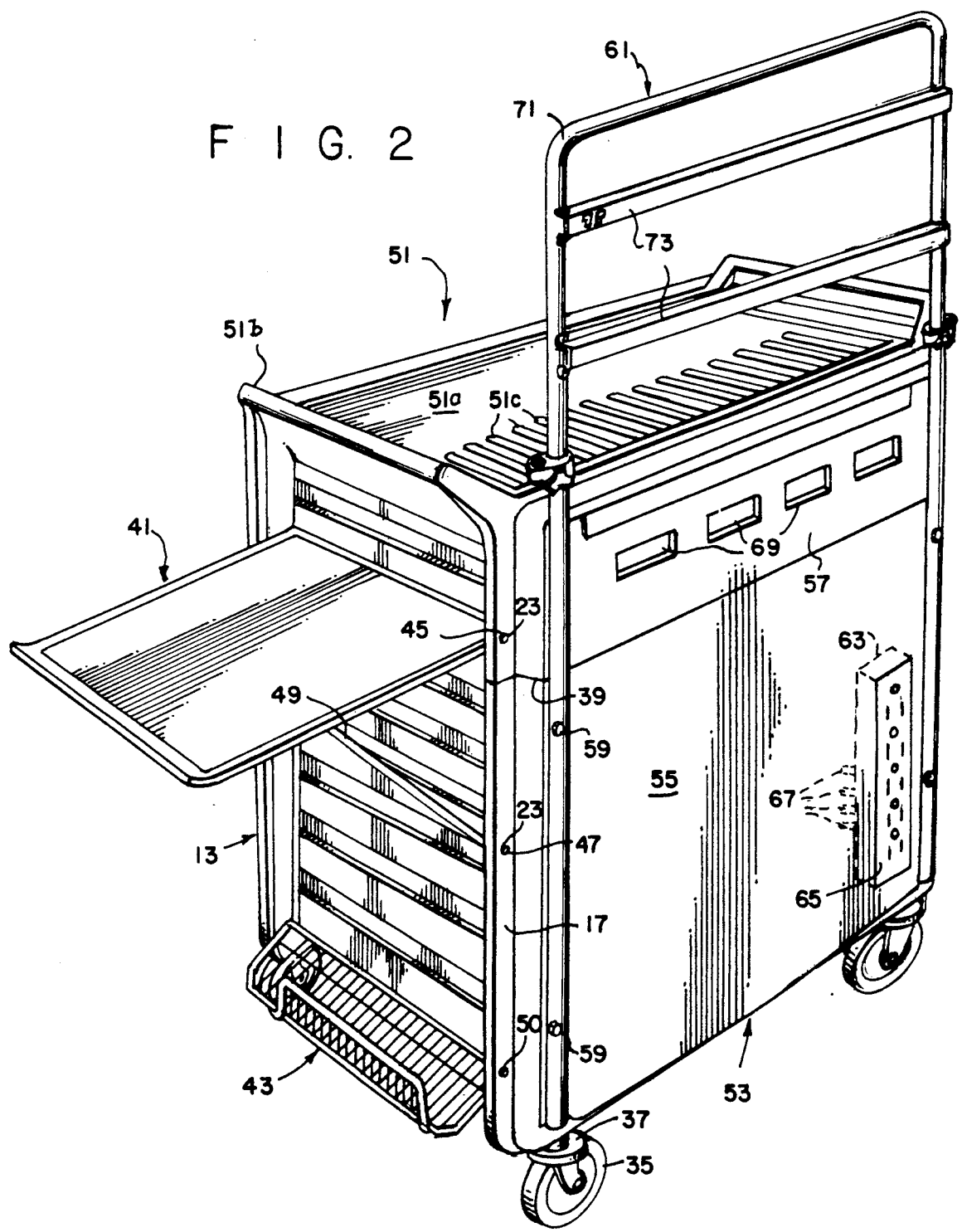

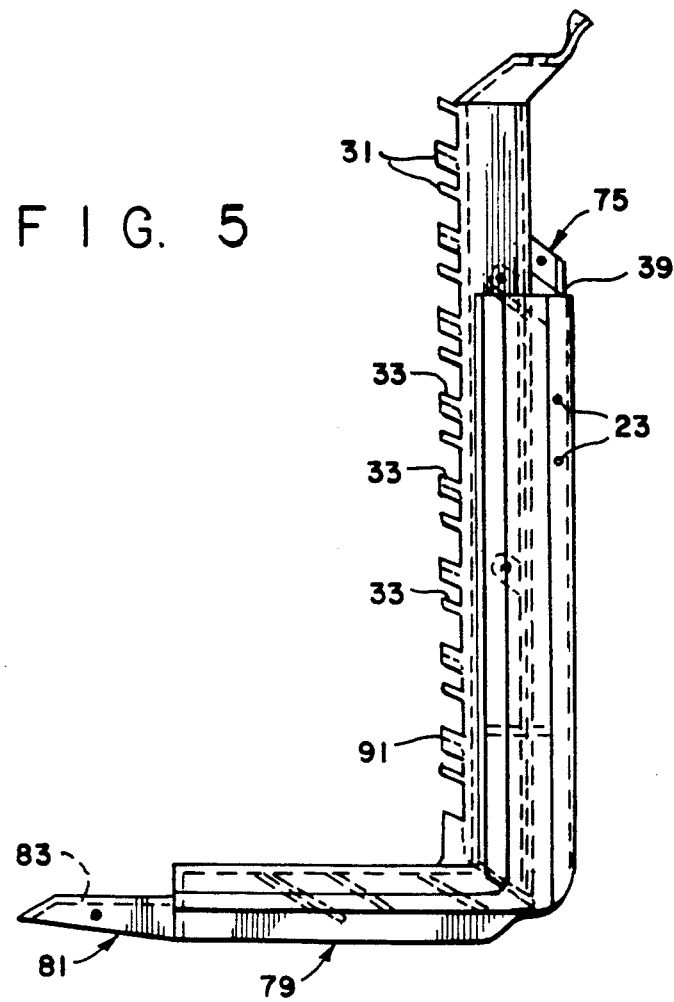
FIG. 5
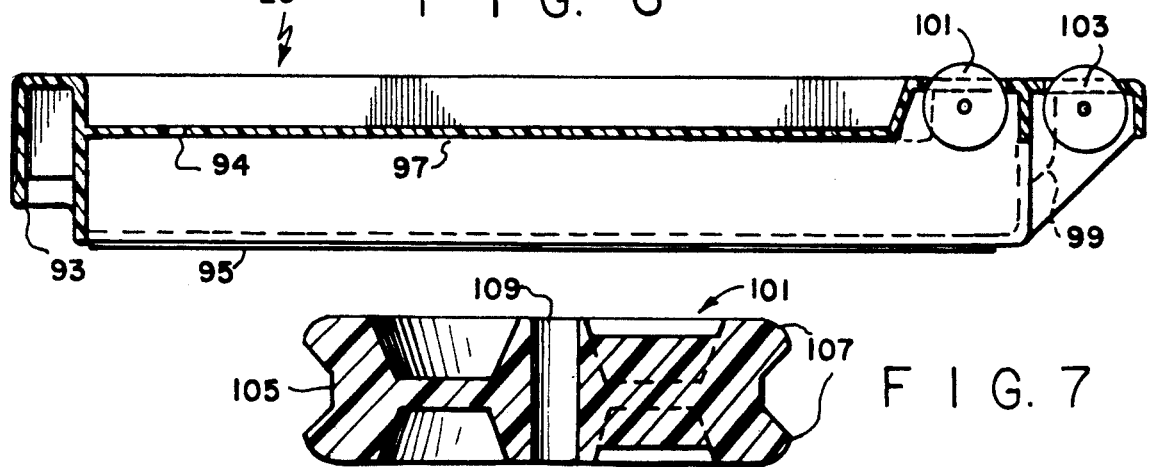
FIG. 6
FIG. 7

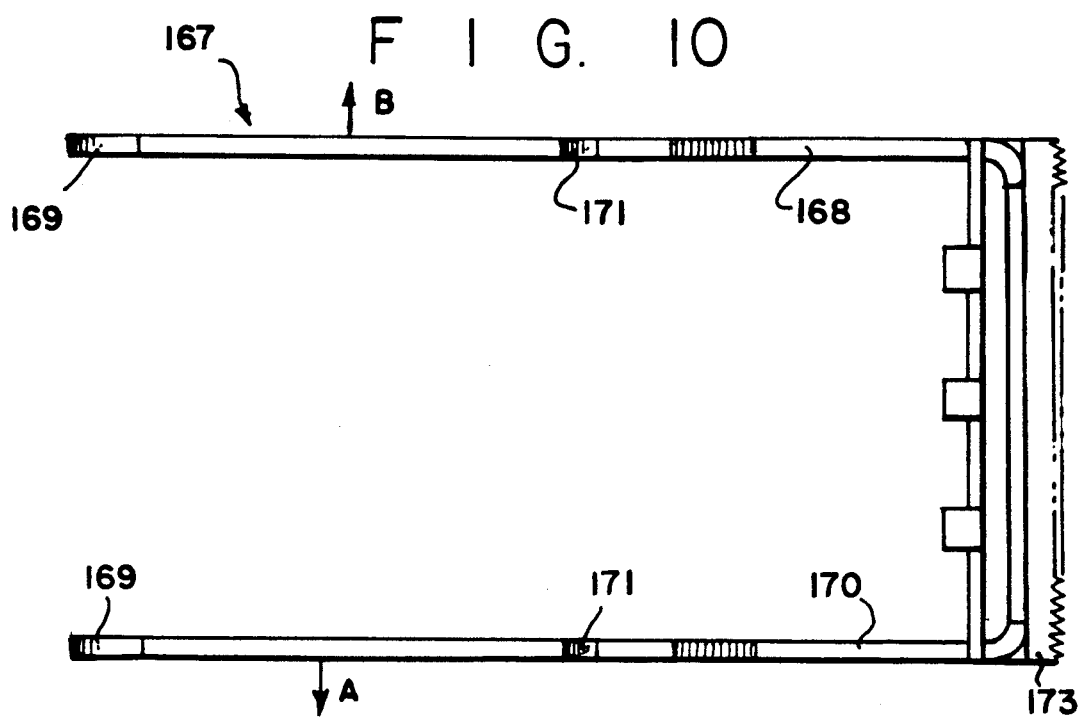
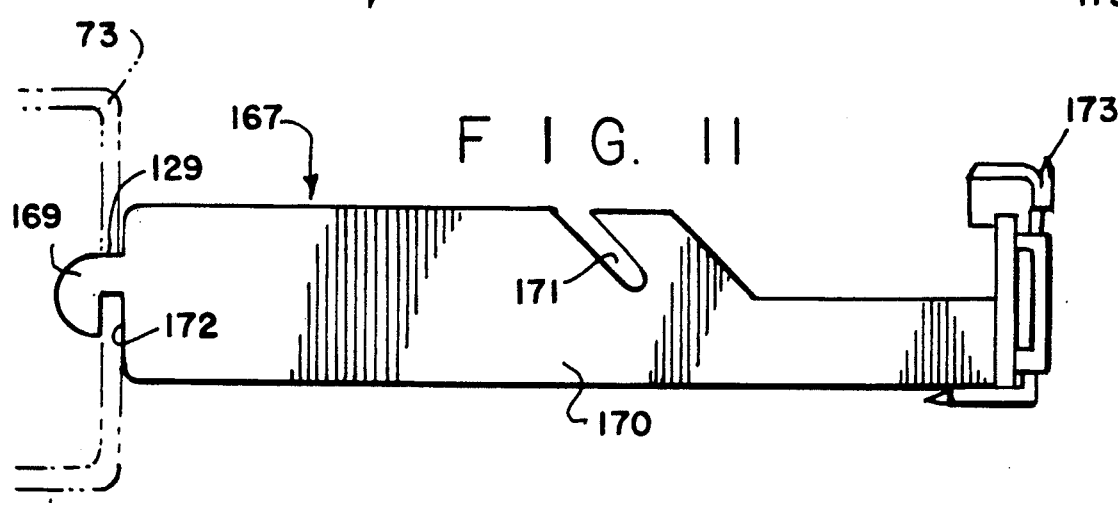
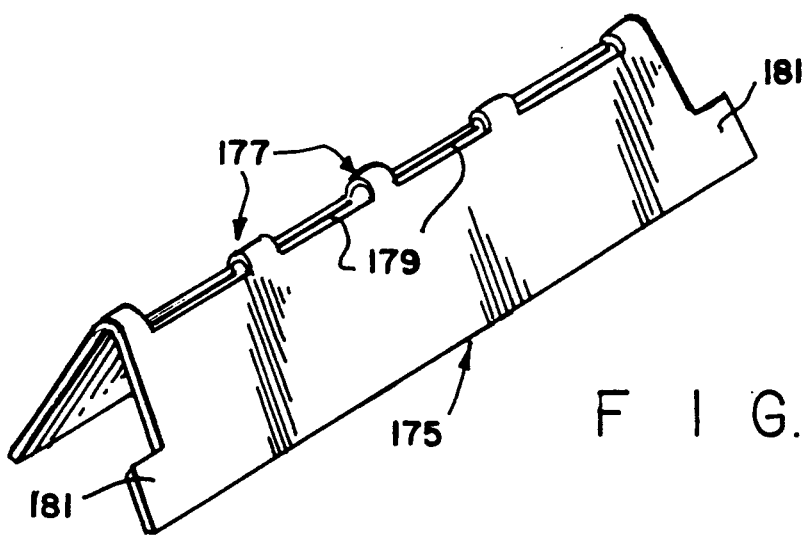

MODULAR UTILITY CART

BACKGROUND OF THE INVENTION

1. Field of the Invention

The present invention relates to a modular utility cart and, more particularly, to such a cart that is easy to manufacture, assemble, and use. While the present invention will be described in with specific reference to a medical utility cart usable in hospitals, doctors offices, and the like, it is to be understood that the teachings of this application, and the claims appended hereto, pertain to a modular utility cart that can be used for any purpose.

The field of carts is rather well-developed with various examples being used in medical, retail, manufacturing, and other environments. Generally, a cart comprises four sides and a top, and may be movable. However, most known carts consist of a large number of independent structures that must be welded, bolted, or connected together in some other way. Thus, manufacturing and assembling known carts requires a great number of steps that can be expensive and time consuming.

A further drawback to known carts is that they often require extensive modification for particular applications. That is, each cart user is required to modify his or her cart in order to adapt it to his or her particular requirements.

The above-described problems are particularly disadvantageous in the medical field where carts are required to hold a wide range of medical equipment and accessories such as electrical components, surgical tape dispensers, waste containers, and the like. Furthermore, medical carts should be light-weight, easy to maintain, and adaptable to fit a wide variety of uses such as in the emergency rooms, operating theaters, and patient rooms.

Therefore, what is needed is an inexpensive, easy-to-assemble, light-weight cart which can be readily adapted to a wide variety of applications.

2. Description of the Prior Art

Carts used in the medical field are well known. One consists of a design originally made for storing tools and is formed of sheet metal. This example has a fixed number of standard-sized drawers, generally of only one configuration, and a fixed top of standard height. Because of the design and materials used in its construction, this known cart cannot be easily adapted to specific applications, is heavy, and, therefore, is cumbersome to use.

InterMetro Industries Corporation, assignee of the subject invention, also offers a Medical Emergency Crash Cart that is described in U.S. Pat. No. 4,790,610 and in pending U.S. Patent Application Ser. No. 243,212. This design represented a substantial improvement over known carts in the art. However it was specifically conceived as a crash cart, that is, one equipped for medical emergencies. Therefore, its adaptability to other applications is somewhat limited. Accordingly, through extensive study the inventors of the present invention recognized that further improvement was still possible.

SUMMARY OF THE INVENTION

The present invention relates to a modular utility cart that overcomes the drawbacks outlined above. In particular, the cart according to a preferred embodiment of the present invention includes identical first and second side panels or members. Each side panel has an integral bottom portion that is adapted to mate with the bottom portion from the opposite side panel. Thus, two one-piece structures may be coupled together to form both the sides and the bottom of the cart. Preferably, each cart side panel comprises a one-piece, molded plastic structure for ease of manufacture. That is, where one very large part forming both the sides and bottom of a cart may be difficult to mold of plastic, two identical smaller parts may be made more easily for simple assembly. Each of the side panels preferably includes a number of structures adapted to offer flexibility in end use. In particular, each side panel may include a plurality of upwardly-angled drawer rails that accommodate one or more drawers within the cart. The spacing between adjacent drawer rails may be predetermined to allow different sized drawers to be inserted anywhere in the cart. Furthermore, the side panels may each include a coupling structure whereby cart tops having different configurations may be secured thereto. For example, a high-top or a low-top structure may be coupled to the side panels.

Alternatively, a modular cart system offering carts having different top heights may be provided by one top configuration mountable on different assembled side panels having respectively different heights.

Each side member also may include two corner portions and a recessed central panel. The central panel may be corrugated, and the corner portions may include holes or be equipped with pins adapted to hold accessories such as a foldable tray, pivotable bins, waste receptacles, oxygen tanks, or other devices.

The cart may also include a tubular support structure coupled to the side members and adapted for holding a wide variety of accessories. For example, one or more U-shaped channels may be coupled to the tubular support structure. The U-shaped channels may include a plurality of horizontal and vertical holes formed to hold accessories such as tape dispensers, storage bins, and the like. In addition, a two-piece coupler may be provided and has a first hole formed to embrace the tubular support structure, and a second hole adapted to hold accessories. Each hole in the coupler may be lined with a plastic collar.

As an additional feature, the preferred embodiment of the present invention may include drawers each having rollers constructed to contact two adjacent upwardly angled drawer rails. Specifically, each drawer may include first and second rollers having a groove therein shaped to ride on an upper edge of a first lower drawer rail, and a rounded or beveled edge adapted to be guided by a second upper drawer rail immediately above the first drawer rail.

A further feature of the present invention includes first and second back panels coupled to a back of the cart. The first panel may be removable and preferably includes a plurality of ventilation holes to allow electrical equipment within the cart to be properly ventilated. The second back panel may include a depressed portion shaped for receiving an electrical outlet bus, and having a hole in the depressed area for allowing wires to pass therethrough.

The preferred embodiment of the present invention can also include a latch structure coupled to one of the side members and adapted for preventing drawers from opening. This is particularly advantageous to prevent drawers from opening when the cart is in motion.

The above-discussed and further advantages according to the preferred embodiment of the present invention may be readily understood from the following detailed description when taken in conjunction with the accompanying drawing.

BRIEF DESCRIPTION OF THE DRAWINGS

FIG. 2 is a perspective view of the cart taken from the rear and right side;

FIG. 5 is a front elevational view of the cart side member;

FIG. 6 is a cross-sectional view of a drawer adapted to be inserted in the cart; FIG. 7 is a cross-sectional view of a drawer roller;

FIGS. 10 and 11 respectively depict top and side views of a tape dispenser adapted to be mounted on the U-shaped channel shown in FIG. 8;

FIG. 12 shows a tape spool holder formed to be inserted into the tape dispenser illustrated in FIGS. 10 and 11;

DETAILED DESCRIPTION OF THE PRESENTLY PREFERRED EMBODIMENT

The present invention provides a light-weight modular utility cart which is easy to manufacture and assemble. Ease of manufacture and assembly is achieved through the structural design of the cart components. Preferably, the major cart components are made of molded plastic and comprise one-piece, unitary, and integral structures.

Figure 1:
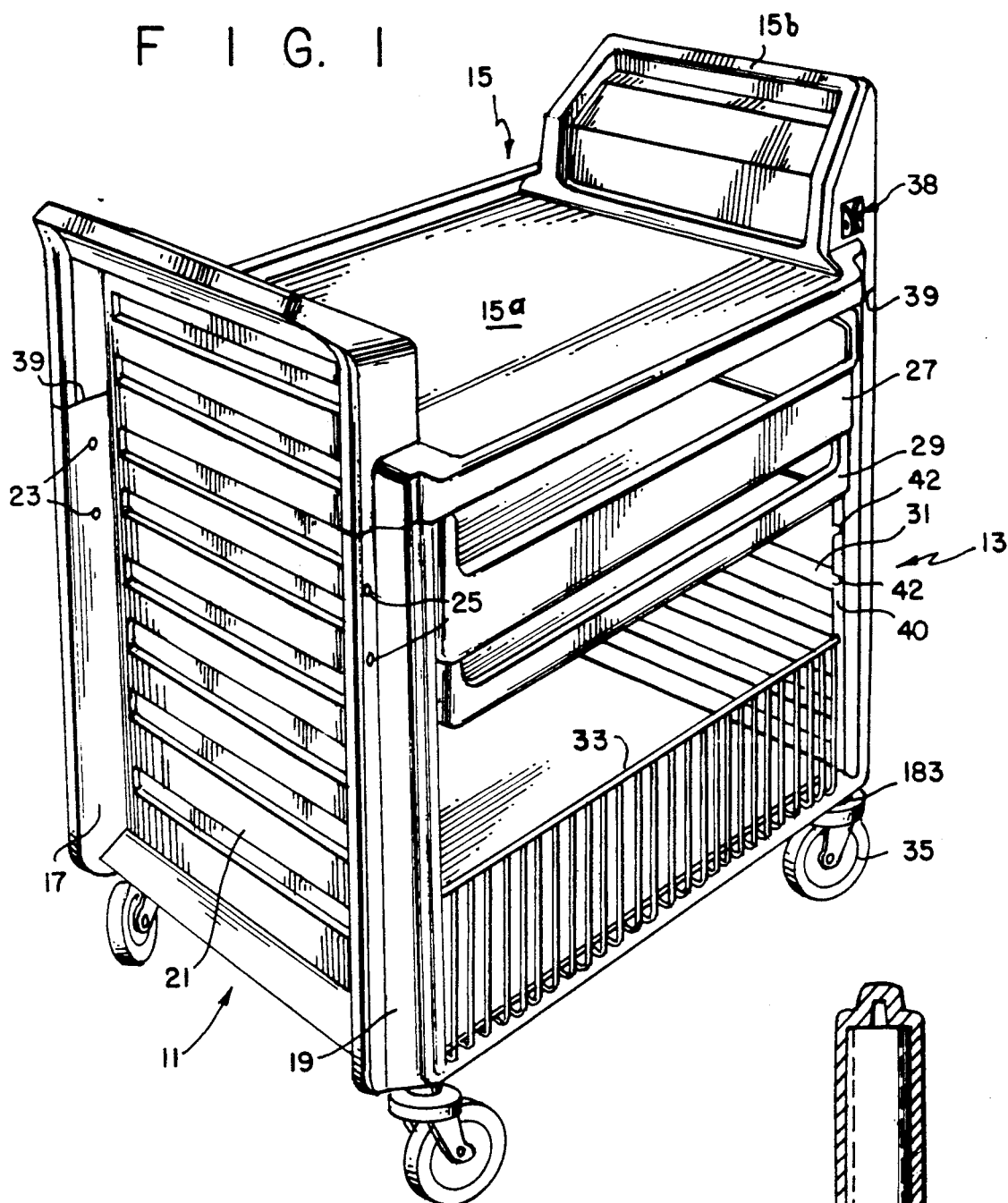
FIG. 1 is a perspective view of the cart taken from the front and left side.

FIG. 1 is a perspective view of a modular utility cart according to the present invention depicting cart side panels or members 11 and 13, and a cart top 15. Each side member includes corner portions 17 and 19 and a depressed panel portion 21. The depressed panel portion 21 may include a plurality of corrugations or ribs horizontally disposed therein. In addition, each side member may include holes, hole plugs, pins 23 and 25 for holding accessories in a manner to be described later.

The cart also includes drawers 27 and 29 that may be of different sizes, that is, depths. Drawer rails 31, also shown in FIG. 5, are formed integrally with each side member 11 and 13 and carry the drawers.

The cart also may include a storage grate 33 that retains products within the cart structure.

The cart may also include a plurality of casters 35 coupled thereto for swiveling movement within caster adapters 183. These structures will be described in more detail below.

A latch 38 may be provided in the cart on one side member 13. This latch functions to prevent the drawers from moving horizontally in order to prevent accidental drawer opening. Latch 38 is coupled to a vertical bar structure 40 which spans the height of the cart. When the latch 38 is activated, the bar structure 40 locks into a notch 94 in the drawer (FIG. 6) to prevent the drawer from opening as will be described below.

In FIG. 1, the top 15 shown is a so-called low-top member in which the horizontal surface 15a is depressed from the uppermost portion or handle 15b by approximately 4 inches to 1 foot. This design permits large pieces of equipment to be carried on the cart top 15 and permits easy access to such equipment.

FIG. 1 also depicts seams 39 which comprise the interface between the side members 11 and 13 and the top member 15.

FIG. 2 is a rear perspective view of a cart which has been modified somewhat from that shown in FIG. 1. In FIG. 2, side member 13 has coupled thereto a folding tray 41 and accessory grate 43. As noted above, side member 13 may include holes, hole plugs, or pins 23 and 25 adapted to mount various components like the tray 41 or grate 43. For purposes of illustration, the holes 25 are shown on the outside of the corner portion 19 in FIG. 1 and holes 23 are shown on the outside of corner portion 17 in FIG. 2. In the preferred embodiment, however, these holes would only be present on the insides of the respective corner portions to provide a clean appearance and to provide a stop for any pin received therein from the insides of the corner portions. In FIG. 2, the folding tray 41 includes a pin 45 which is inserted through holes 23 and 25 and forms the hinge for the tray 41. In addition, the folding tray 41 includes a second horizontally-disposed pin 47 which holds a supporting strut 49 that supports the folding tray 41 in a horizontal position. Persons of ordinary skill in this field will quickly perceive that the supporting strut 49 may be adapted to allow the tray 41 to fold to a vertical position where it is substantially flush with the corner portions of side member 13. For example, the support strut 49 may be decoupled from the undersurface of folding tray 41 and then both the tray 41 and the strut 49 may be folded downwardly. Alternatively, the pin 47 can be detachable from the corner portions of the side member 13 in order to allow the folding tray 41 and supporting strut 49 to be lowered.

The accessory grate 43 may also be coupled to the side member 13 through a horizontal pin 50. Accessory grate 43 can be used to carry oxygen tanks, waste receptacles, and the like. Those having ordinary skill in this field can readily understand that by providing a plurality of holes, hole plugs, or pins in the side portions of side member 13, a wide variety of wires, pins, grates, and similar structures, may be coupled to the cart side. This offers optimum flexibility to the end user to design the cart for a specific purpose.

Also depicted in FIG. 2 is top member 51 which has a different configuration from the top member 15 shown in FIG. 1. Specifically, the top member 51 is a so-called high-top structure. Thus, horizontal surface 51a is proximate to the uppermost surface or handle 51b by approximately 3 to 6 inches. It should be emphasized that either top member 15 or 51 may be coupled to the side members 11 and 13. Again, flexibility of ultimate use of the cart is provided by this structure of the present invention. Note also that the horizontal surface 51a may include a plurality of corrugations 51c which, for example, may be used to hold tubes, hypodermic needles, or other small pieces of equipment. Then, when the cart is moved, such pieces of equipment will not roll on or from the horizontal surface 51a.

In FIG. 2, a back section 53 comprises a lower panel 55 and an upper panel 57. The lower panel 55 may be mounted on the side members through bolts 59 which also engage a tubular support structure 61, to be described later. Bottom panel 55 may also comprise a one-piece structure of molded plastic adapted to fit between side members 11 and 13. The bottom panel 55 includes a depressed portion 63 shaped to hold an electrical outlet bus 65 therein. The depressed portion 63 may also include a plurality of holes 67 which allow electrical wires to pass from inside the cart to the electrical outlet bus 65.

The top panel 57 of the back section 53 is configured to be removably mounted on side members 11 and 13. For example, the top panel 57 may include lips and/or edges designed to fit into corresponding structure on the side members. Persons of ordinary skill in this field will readily understand that many structures are available for removably attaching top panel 57 to the cart, and therefore, such structure will not be described in further detail. However, it is preferable that top panel 57 is also a one-piece structure comprising molded plastic. Note also that top panel 57 includes a plurality of ventilation holes 69 which allow ventilation of the top section of the cart. For example, in many applications, it is desireable to have electronic equipment carried at the top of the cart, and thus, such ventilation of the top portion of the cart is very useful.

FIG. 2 also shows an accessory the support structure 61 that may comprise a U-shaped tubular support 71. Of course, the tubular support 71 may include two separate members, rather than one U-shaped structure. The tubular support 71 is bolted to the side members 11 and 13 with respective vertically extending lips 56 of the lower panel 55 of back section 53 sandwiched therebetween. Those of skill in this field will understand that any known and convenient method of attaching tubular support 71 to the cart may be used.

Accessory support structure 61 may also include one or more U-shaped accessory-holding channels 73. These channels 73 are designed to hold a wide variety of accessories and further accessory supports and will be described in greater detail later herein.

Figure 3:
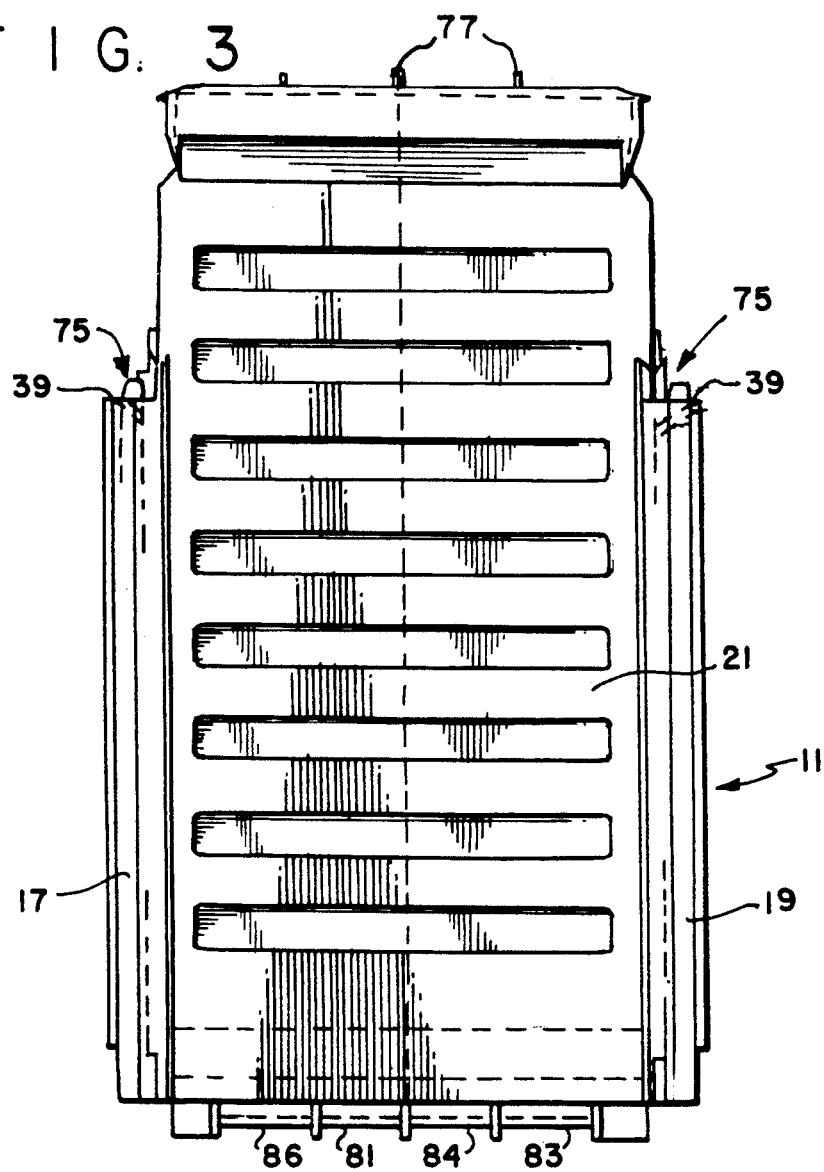
FIG. 3 is a side elevational view of the cart side member.
Figure 4:
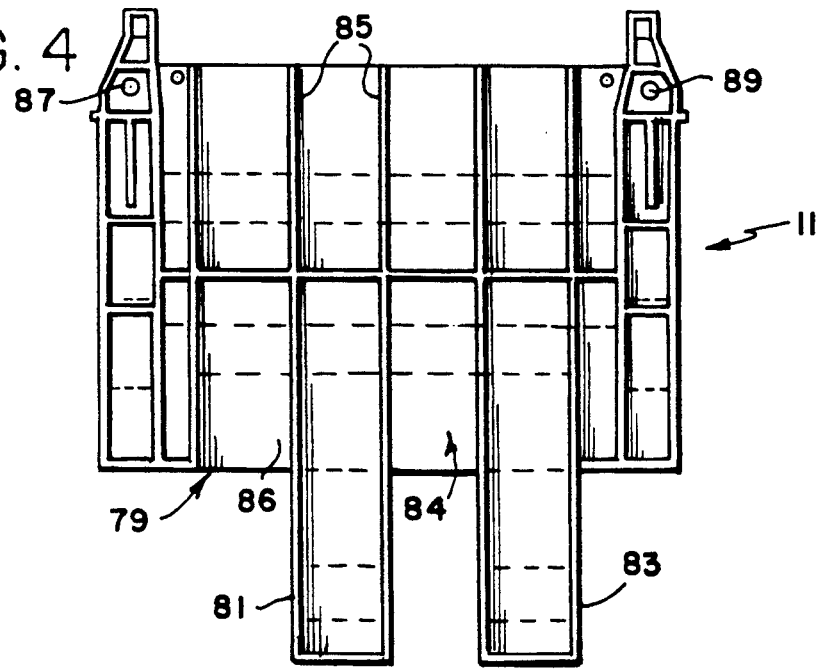
FIG. 4 is a bottom view of a portion of a side member.

FIG. 3 is a side elevational view of either side member 11 or 13, while FIG. 4 is a bottom view thereof. As shown in FIG. 3, each side member includes a depressed panel portion 21 and corner portions 17 and 19. The panel 21 extends to the top of the cart, while corner portions 17 and 19 extend only partway to the top. Thus, either a high-top member 15, or a low-top member 51, both provided with side sockets 58 (FIG. 1), can be coupled to the side members 11 and 13 by being lowered over respective upper portions 76 of the panels 21. Note that each corner portion 17 and 19 terminates at seam 39 and includes intercoupling structures 75 which are configured to receive corresponding intercoupling structures on top member 15 or top member 51. Note also that depressed panel 21 includes coupling structures 77 which are configured to be received in corresponding coupling structures with the sockets 56 in top member 15 or top member 51.

It is to be understood that carts of different heights may be provided by the present invention by utilizing a single top configuration, like 51 shown in FIG. 2, but by providing side members 11 and 13 of different heights.

FIG. 3 also shows the horizontal corrugations or ribs in depressed panel 21. These corrugations may correspond to the location of the drawer rails on the other side of side member 11, to be discussed later herein.

FIG. 4 shows the bottom portion 79 of side member 11. This bottom portion is preferably integral with corner portions 17 and 19 and depressed panel 21. Thus, each side member preferably comprises a one-piece structure which may be made of molded plastic. High-efficiency manufacturing and rapid assembly of carts may be achieved for reasons that will be apparent from the description provided below.

Bottom portion 79 of each side member 11 and 13 includes first and second inwardly projecting fingers 81 and 83. It will be appreciated that the fingers are evenly spaced and are separated by one channel 84. Another channel 86 is adjacent finger 81. Therefore, these fingers can be interlaced with corresponding projections from an identically formed side member 13 or 11 in order to complete a cart bottom. Thus, all that is necessary to form sides and a bottom for the cart are two, identical side members, assembled by pushing the fingers 81 and 83 of one side member into the corresponding channels 86 and 84 of the other side member in interlaced fashion. The two side members may be secured together by any suitable means like screws, bolts, or pop-rivets.

FIG. 4 also shows a number of vertical structural supports 85 which provide the bottom portion 79 with increased load bearing capability.

FIG. 4 still further shows caster sockets 87 and 89 which are preferably molded into bottom portion 79 when the side members are being molded. Caster sockets 87 and 89 are configured to receive caster adapters and casters as will be described below.

FIG. 5 is a front view of side member 11 clearly showing integral bottom portion 79, projecting fingers 81, 83, holes 23, seam 39 and coupling structure 75. Drawer rails 31 are integral on the inside surface of side member 11. As can be seen, each drawer rail 31 is angled upwardly from a horizontal plane on the inside of the central portion 21. This upward angle presents a narrow edge 33 at the uppermost portion of each drawer rail. This uppermost edge is adapted to fit within a corresponding groove 105 in the drawer rollers shown in FIG. 7 and to be described later herein. Each roller is also adapted to ride upon the uppermost edge of one drawer rail, while being guided by the lower surface of the drawer rail immediately thereabove.

The drawer rails 31 are symmetrical with respect to a vertical center line of each side member so that each drawer can be inserted from either the front or back of the cart. Of course one or more modular back section 53 of the cart would be omitted if drawers were to be inserted from the back.

Close inspection of FIG. 5 reveals that every second drawer rail 31 includes a vertically extending flange 91. The flange 91 is disposed at each end of the rail and can be used to function as a drawer stop to prevent the drawers from being easily withdrawn from the cart. Of course, the flange 91 is designed so that a drawer may be inserted in the cart. One or both sides of the drawer may be equipped with a lever (not shown) that in one position interferes with the flange 91 to prevent removal of the drawer from the cart and in another position is moved out of interference with the flange to permit removal of the drawer.

It should be stressed that the entire structure shown in FIG. 5 preferably comprises a one-piece structure of molded plastic. Thus, the manufacturing operation is inexpensive and assembly of such a cart is very rapid.

Also depicted in FIG. 5 is the fixed spacing between adjacent drawer rails 31. The spacing between rails 31 is predetermined in order to accommodate drawers of different depths. Thus, a shallow drawer 29 (FIG. 1) may span only two rails 31, a deeper drawer 27 (FIG. 1) may span three or more rails 31. In the preferred embodiment the rails are spaced to accommodate drawers that have depths which are multiples of three inches.

FIG. 6 is a cross-section view of a drawer 29 which may be used with the cart. Specifically, drawer 29 may comprise a one-piece, molded plastic structure including a handle-lip 93, drawer bottom 95, and drawer slide surface 97. The drawer slide surface 97 is also adapted to slide along the uppermost edge of a drawer rail 31. Each drawer preferably includes a plurality of detent grooves 99 at the back thereof. These grooves are vertically extending and are disposed across the back of the drawer. The grooves 99 allow vertical drawer dividers (not shown) to be inserted in the drawer. Thus, each drawer may be divided into a plurality of compartments.

The drawer 29 may also include a notch 94 in slide surface 97, which engages the bar structure 40 as described above, to lock the drawer inside the cart. More specifically, the bar 40 has a plurality of notches 42 that in an unlocked, raised position of the bar register with the slide surface 97. However, in a lowered locked position of the bar, the notches 42 are moved from registration with the slide surface such that projecting tabs 44 on the bar intermediate adjacent notches 42 lie within notches 94 in the slide surface 97. This interference between a tab 44 and a side surface of a notch 94 prevents a drawer from being pulled out from the cart. Any suitable mechanism for raising and lowering the bar may be used.

FIG. 7 is a cross-sectional view of drawer rollers 101 and 103. The rollers 101 and 103 may be identical and are disposed along the same horizontal plane on each drawer. Each roller comprises a cylindrically-shaped structure having a trapezoid-shaped groove 105 in a center portion of the circumferential surface thereof. Groove 105 is formed to ride along the uppermost edge 33 of one drawer rail 31. Each roller 101 and 103 also includes rounded or beveled edges 107 located on outer portions of the circumferential surface thereof. These edges 107 are adapted to fit flush against or to make a point contact with, and be guided by, the lower surface of an upper drawer rail 31 immediately above the drawer rail which is received in the groove 105.

When a drawer is pushed into the cart, the grooves of both rollers ride on the upper edge of the lower drawer rail. However, when the drawer is pulled out of the cart, the groove of the forward-most roller rides on the upper edge of the lower rail while the rounded or beveled edge of rearward-most roller rides on the under surface of the upper rail. This arrangement prevents the drawer from tilting excessively downwardly when pulled out of the cart.

Preferably, the rollers 101 and 103 each comprise a one-piece structure of molded plastic. Again, uniformity of design permits inexpensive manufacturing and ease of assembly.

Figure 8:
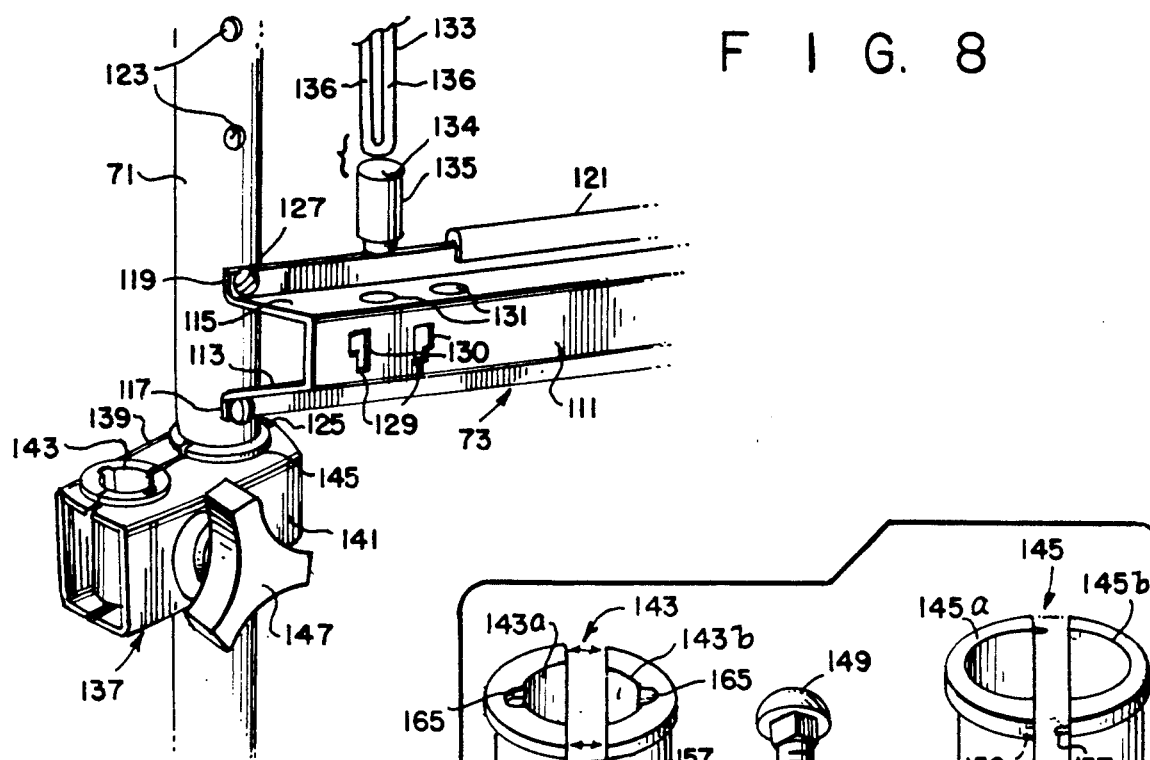
FIG. 8 is a perspective view of the tubular support structure, U-shaped channel, and two-piece coupler for supporting various accessories above the top of the cart according to the present invention.

FIG. 8 is a close-up view of the tubular support 71 and U-shaped channel 73 shown in FIG. 2. The U-shaped channel 73 comprises a base 111, two legs 113 and 115, and flanges 117 and 119. The base 111 is generally vertically disposed so that the flange 119 presents an upward-extending lip which may be used for coupling an accessory lip 121 thereto. Flanges 117 and 119 are coupled to screw taps 123 in the tubular support 71 with a plurality of screws 125 and 127.

The base 111 also includes a plurality of inverted L-shaped slots 129 which are adapted for holding accessories. Each slot 129 has at least, five sides, preferably six, thereby to define a blank portion 130 for securely engaging accessories that may be attached thereto. For example, a surgical tape dispenser (to be described below) can be attached to L-shaped slots 129 in a secure fashion so that medical personnel can rapidly and safely extract tape without the dispenser becoming dislodged from the U-shaped channel 73.

Furthermore, the U-shaped channel 73 includes a plurality of oblong-shaped holes 131 in both the legs 113 and 115. Preferably, the holes 131 in each leg 113 are vertically aligned with corresponding holes in the other leg 115. Thus, vertical accessory support structures, like a twin-wire structure 133, may be inserted into holes 131. The twin wire structure may be formed by bending a single wire to create bottom loop 134 and parallel side wires 136. Such twin-wire support structure 133 may be used to hold a wide variety of accessories such as waste receptacles, lights, plasma bags, and the like. The oblong shape of holes 131 and the twin-wire support structure 133 combine to prevent the wire structure 133 from twisting or turning in the hole 131. Thus, a stable support is provided for accessories.

A plastic collar 135 may be inserted between vertically-aligned oblong holes 131 to add further support to the twin-wire structure 133, and to prevent wire structure 133 from marring or disfiguring the U-shaped channel 73. Those of skill in this field can readily understand that the tubular support 71 and U-shaped channel 73, together offer a wide variety of coupling structures adapted to hold an almost infinite variety of accessories. Thus, each user can configure the cart to serve a wide variety of uses.

Also depicted in FIG. 8 is a two-piece coupler 137. This coupler basically comprises coupler sides 139 and 141, collars 143, 145, and three-wing knob 147. The two-piece coupler 137 defines two different-size holes therein. One hole is adapted to fit around tubular support 71, while the other hole is adapted to carry an accessory. The accessory may be a different smaller diameter tube, like an IV-pole, or may be a two-wire structure 133 adapted to fit inside collar 143.

Figure 9:
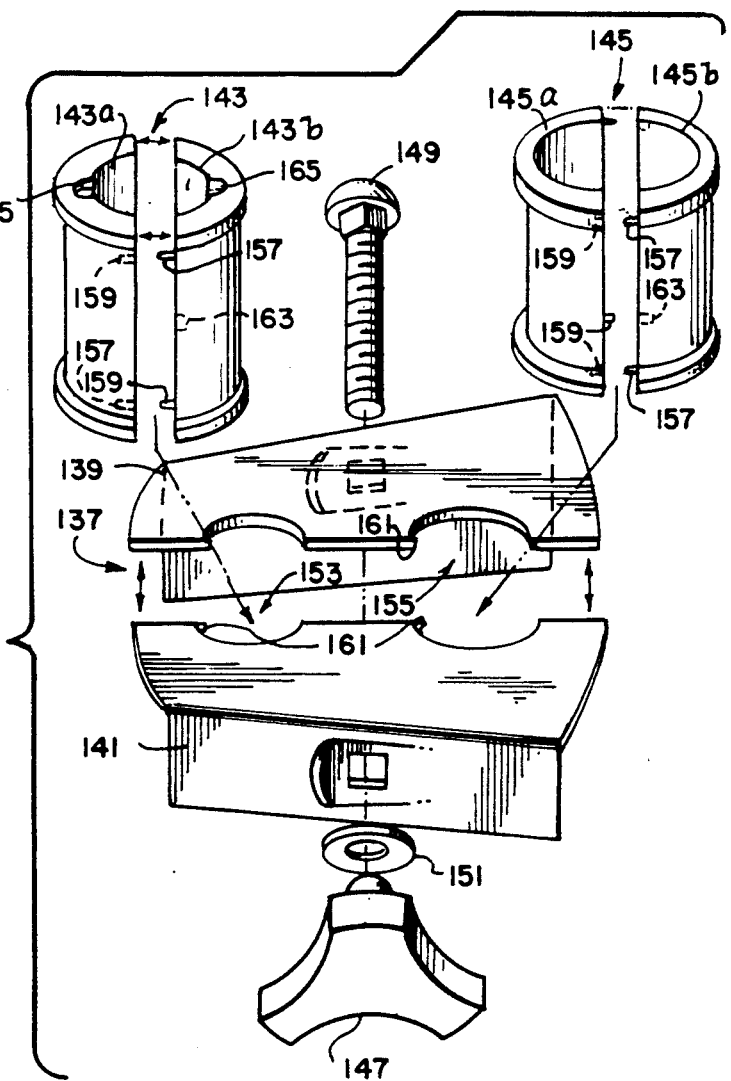
FIG. 9 is an exploded perspective view showing the constituent parts and assembly of the two-piece coupler depicted in FIG. 8; .

FIG. 9 is an exploded view of the two-piece coupler 137. As shown there, a carriage bolt 149 extends through bracket sides 139, 141, through a washer 151, and is threaded into the three-wing knob 147. Different size holes 153 and 155 defined by the assembled coupler sides 139 and 145, respectively hold collars 143 and 145. Each collar can comprise two identical plastic pieces which are linked together through coupling structures such as tabs 157 and holes 159.

The coupler side 141 can include nubs 161 therein. These nubs may be adapted to fit into recesses 163 located in each collar 143 and 145. This will prevent the collars 143 and 145 from being rotated within the holes 153 and 155 and holes the collar halves in the respective coupler sides. However, the nub and recess configuration can be omitted if it is desired that the collars be rotatable in the respective holes to provide flexibility in positioning accessories. It is noted that for purposes of illustration, the collars shown in FIG. 9 are rotated 90 degrees from their positions in which they are assembled with the coupler sides. That is, in the preferred embodiment each collar half is received in one half of an associated hole in the coupler sides.

The collar 143 may include diametrically opposing, axially extending grooves 165 in each collar half. These grooves are dimensioned to securely grip a twin-wire support structure 133. This configuration provides yet another point at which accessories can be attached to the cart of the present invention with modular components.

FIGS. 10 and 11 show one such accessory which may be coupled to U-shaped channel 73. This accessory is a tape dispenser which comprises a resilient U-shaped support 167, with a tape cutter 173 formed at the base thereof. Tabs 169 are provided at the distal ends of the support arms 168 and 170 and are adapted to be inserted into L-shaped slot 129 (FIG. 8) of U-shaped channel 73. The arms 168 and 170 of U-shaped bracket 167 are resilient and are biased to cause them to outwardly move in the directions of arrows A and B in FIG. 10. To attach the tape dispenser to U-shaped channel 73, the operator squeezes the arms of bracket 167 together, inserts tabs 169 into slots 129, and then releases his or her grip to allow tabs 169 to firmly lock into holes 129. The shape of each hole 129 cooperates with the shape of each tab 169 to hold the tape dispenser in place, regardless of the direction and magnitude of the forces placed thereon. More particularly each tab has a slot 172 (FIG. 11). When the arms 168 and 170 are released after the tabs 16 are inserted fully into slots 129, each slot 170 is urged outwardly to receive and engage a blank portion 130 (FIG. 8) formed at the side of each slot 129, thereby to engage the support 167 on the channel 73 and be cantilivered therefrom. It will be appreciated from FIG. 11 that the end 132 of each arm 170 limits the insertion of each tab 169 into a corresponding L-shaped slot 129.

Preferably, tape dispenser bracket 167 comprises a one-piece structure. Coupled, to the end of the tape dispenser is the tape cutter assembly 173 which may comprise metal and may have a plurality of serrated edges designed to cut tape. Such structure is reasonably well known and will not be described in further detail herein.

The tape dispenser also includes notches 171 in both arms 168 and 170 that hold an axial tape spool holder. FIG. 12 depicts such a tape spool holder 175 designed for use with the tape dispenser support 167. Specifically, tape spool holder 175 is preferably a folded piece of metal having tabs 181 along opposite edges thereof. Tabs 118 fit within slots 171 of the tape dispenser bracket 167. Along the folded edge 177 of spool holder 175 are formed a plurality of notches 179 each adapted to hold a tape spool. Thus, as tape is dispensed, the tape spool lies within one notch 179 maintaining a stable position. It is preferable that the spool holder 175 comprise a one-piece structure. This allows for ease of manufacture, since the spool holder can be stamped from a single piece of metal and then be folded to give it the proper shape.

Figure 13:
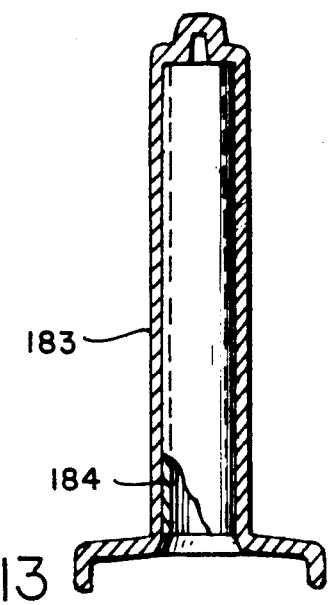
FIG. 13 is a cross-sectional view of a caster insert designed to be coupled to the bottom portion of a cart side member.

FIG. 13 is a cross-section view of caster adapter 183 which is designed to fit securely within caster sockets 87 and 89 of the cart side members, (FIG. 4). Preferably, caster adapter 183 comprises an integral piece of molded plastic having a cylindrical steel liner 184 therein. In assembly, the vertical shaft of a known wheel and caster assembly (35 of FIG. 1) is first inserted into the steel liner 184 of the caster adapter 183 and then the entire assembly is inserted into a caster socket. The provision of a caster adapter allows the mass manufacturing of side members 11 and 13, and the later assembly of the casters and wheels. Caster adapter 183 also permits easy replacement and repair of the casters without defacing or marring side members 11 and 13. These structure also provides the necessary structural integrity for supporting the cart on the casters.

Figure 14:
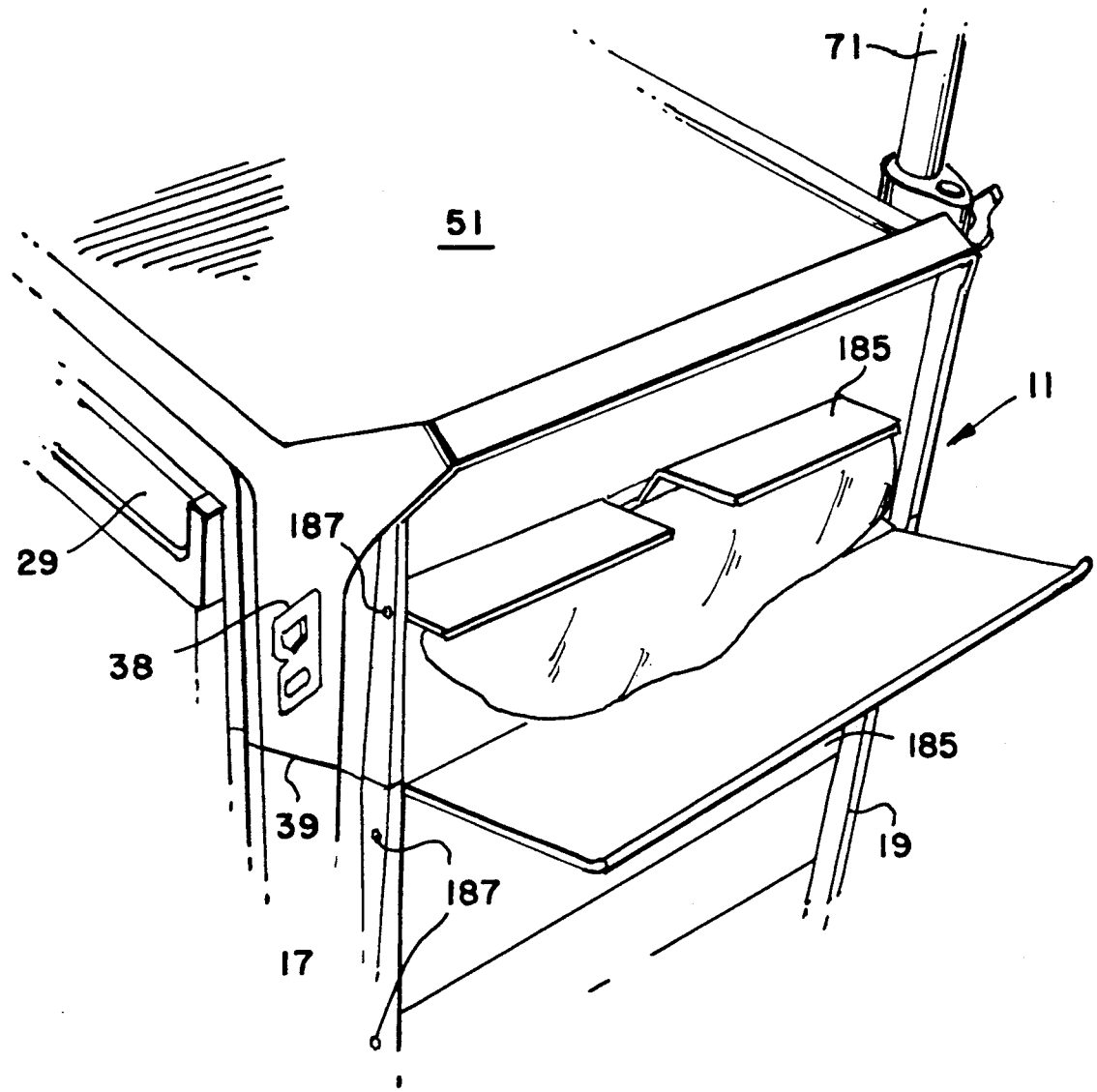
FIG. 14 is a perspective view of a cart showing storage bins attached thereto.

FIG. 14 depicts the attachment of further accessories to the cart side. Specifically, storage bins 185 may be attached with horizontal pins 187 between corner projections 17 and 19 of a side member 11. Preferably, the storage bins each comprise a one-piece plastic material. As can be seen, the storage bins 185 have a storage position wherein an outer surface of the storage bin is substantially flush with corner portions 17 and 19. Storage bins 185 also have an open position wherein the storage bin is rotated out and downward in order to expose the inside of the bin. Such storage bins are readily accessible, yet quickly fold out of the way to provide a compact and versatile structure.

Thus, what has been described is a light-weight, flexible, and compact modular utility cart which is easy to manufacture and assemble. The design features of this cart permit the operator to configure it for a wide variety of uses. The end result is an inexpensive cart capable of being adapted to a broad range of uses, particularly in the medical field.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A modular cart comprising:
   a pair of identical, rigidly formed, unitary side members each having a generally upstanding side portion integrally formed with a generally laterally extending bottom portion, said bottom portion of each said side member being formed with means for interengaging identical means formed with the bottom portion of the other said side member, said interengaging means on each said side member comprising first and second fingers located asymmetrically and in side by side spaced relation in the longitudinal direction of said bottom portion and projecting laterally from said bottom portion, said first and second fingers of each one of the pair of bottom portions thereby being interlaceable with said first and second fingers of the other one of said bottom portions whereby said bottom portions define a bottom of said cart.

2. A modular cart according to claim 1, wherein each side member includes a plurality of upwardly-angled rails.

3. A modular cart according to claim 1, wherein each side member has a ribbed outer surface.

4. A modular cart according to claim 3, wherein at least one of said side member outer surfaces includes a pair of horizontally directed holes.

5. A modular cart according to claim 1, wherein each side member comprises a one-piece, molded plastic structure.

6. A modular cart system, comprising:
a pair of side members each formed to be coupled to one of (a) a top portion having a horizontal surface proximate the tops of said side members, and (b) a top portion having a horizontal surface depressed from the tops of said side members, said side members being identical and each comprising a one-piece structure, each said side member further including a bottom portion having first and second projecting fingers, said projecting fingers of the pair of side members being interlaced whereby said bottom portions of said side members form a bottom of said cart;
a top portion having a horizontal surface proximate the tops of said side members when coupled to said side members; and
a top portion having a horizontal surface depressed from the tops of said side members when coupled to said side members.

7. A cart comprising:
first and second side panels defining an interior of said cart, each having a plurality of generally longitudinally extending drawer rails, each said drawer rail projecting toward the interior of said cart from one said side panel and upwardly at an acute angle relative to said one side wall thereby to define a channel forming an upwardly open acute angle with said one side panel; and
at least one drawer having first and second rollers, at least a portion of each of at least one of said first and second rollers riding on one rail in said channel and being retained therein by the adjacent rail above said one rail, whereby due to the configuration and interengagement of said rails and said roller, the load of said drawer tends to prevent said side panels from being forced away from each other.

8. A cart according to claim 7, wherein said first and second rollers are identical.

9. A cart according to claim 8, wherein said first roller comprises a cylindrically-shaped body having (a) a trapezoidal-shaped circumferential groove in a center portion of the outer surface thereof, and (b) an edge that is one of rounded and beveled on an outer portion of the outer surface thereof.

10. A cart according to claim 9, wherein the groove of said first roller rides on an edge of said one rail, and the beveled edge of said first roller is guided by a lower surface of said adjacent rail.

11. A cart according to claim 7, wherein said one rail includes a stop at one end thereof for stopping horizontal movement of said drawer.

12. A cart according to claim 11, wherein said first side panel, said drawer rails, and said stop are formed in a one-piece structure.

* * * * *

UNITED STATES PATENT AND TRADEMARK OFFICE
CERTIFICATE OF CORRECTION

PATENT NO. : 5,016,948
DATED : May 21, 1991
INVENTOR(S) : ROBERT J. WELCH ET AL.   Page 1 of 2

It is certified that error appears in the above-identified patent and that said Letters Patent is hereby corrected as shown below: Title page:

AT [75] INVENTORS

"Westcoat Beakley," should read --Wescoat Beakley,--.

AT [57] ABSTRACT

Line 16, "upwardly-angle" should read --upwardly-angled--.

COLUMN 1

Line 9, "in" should be deleted.

COLUMN 2

Line 49, "upwardly" should read --upwardly---.

COLUMN 3

Line 7, "drawing." should read --drawings.--.
Line 15, "ber; FIG. 4" should read --ber; ¶ FIG. 4--.
Line 20, "cart; FIG. 7" should read --cart; ¶ FIG. 7--.

COLUMN 5

Line 32, "desireable" should read --desirable--.
Line 35, "the" should be deleted.

COLUMN 6

Line 34, "load bearing" should read --load-bearing--.

UNITED STATES PATENT AND TRADEMARK OFFICE
CERTIFICATE OF CORRECTION

PATENT NO. : 5,016,948
DATED : May 21, 1991
INVENTOR(S) : ROBERT J. WELCH ET AL.              Page 2 of 2

It is certified that error appears in the above-identified patent and that said Letters Patent is hereby corrected as shown below:

COLUMN 8

Line 61, "sides 139 and 145" should read
         --sides 139 and 141--.

COLUMN 9

Line 1, "holes" should read --hold--.
    Line 37, "tabs 16" should read --tabs 169-- and
         "slot 170" should read --arm 170--.
    Line 41, "cantilivered" should read --cantilevered--.
    Line 45, "Coupled," should read --Coupled--.
    Line 57, "Tabs 118" should read --Tabs 181--.

COLUMN 10

Line 12, "These" should read --This--.

Signed and Sealed this

Tenth Day of March, 1992

Attest:

HARRY F. MANBECK, JR.

*Attesting Officer*      *Commissioner of Patents and Trademarks*